United States Patent [19]

Welcker

[11] 4,111,470
[45] Sep. 5, 1978

[54] RELEASABLE COUPLING AND METHOD FOR MAKING SUCH COUPLING

[76] Inventor: Friedrich Welcker, Im Sonnenwinkel 28, 5850 Hohenlimburg B.R. D, Fed. Rep. of Germany

[21] Appl. No.: 769,330

[22] Filed: Feb. 16, 1977

[30] Foreign Application Priority Data

Feb. 25, 1976 [DE] Fed. Rep. of Germany ....... 2607700

[51] Int. Cl.² ............................................. F16L 39/00
[52] U.S. Cl. .................................... 285/320; 285/312; 285/374; 285/382
[58] Field of Search ................. 285/305, 312, 320, 39, 285/404, 373, 334.5, 374; 403/231, 355, 377, 378, 379, 324

[56] References Cited

U.S. PATENT DOCUMENTS

| | | | |
|---|---|---|---|
| 1,408,993 | 3/1922 | Eberhardt | 403/355 |
| 3,822,074 | 7/1974 | Welcker | 285/305 |
| 3,841,672 | 10/1974 | Schultz | 403/355 X |

FOREIGN PATENT DOCUMENTS

547,776 10/1922 France ..................................... 285/199

*Primary Examiner*—Wayne L. Shedd
*Attorney, Agent, or Firm*—W. G. Fasse; W. W. Roberts

[57] ABSTRACT

The present coupling is intended to connect a tubular member to a further member such as a coupling sleeve or the like. The further member has an aperture for insertion of the tubular member and a hole extending substantially tangentially relative to the aperture and in partial overlap with the aperture. A locking pin with a flattened side region is inserted into the hole and then rotated to interlock the tubular member and the further member by deforming the tubular member. The locking pin may, for example, be a hollow sleeve with a longitudinal slot in the wall of the sleeve to provide said flattened region. The edges adjacent to the slot in the sleeve may be bent inwardly to facilitate the rotation of the sleeve type locking pin.

15 Claims, 15 Drawing Figures

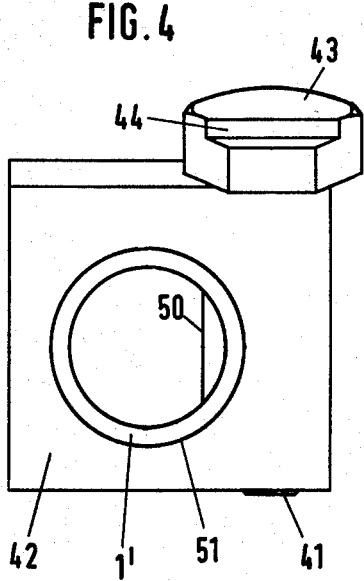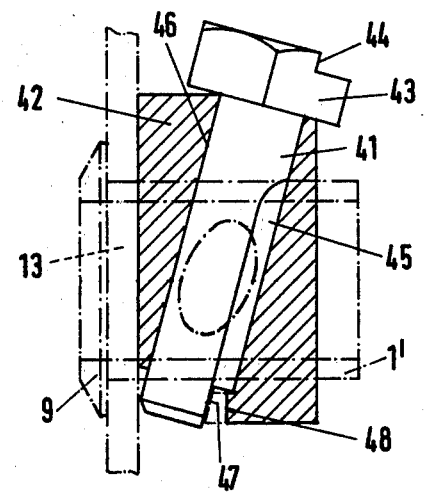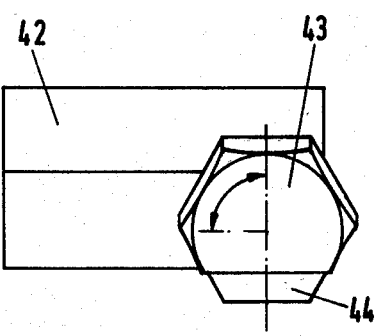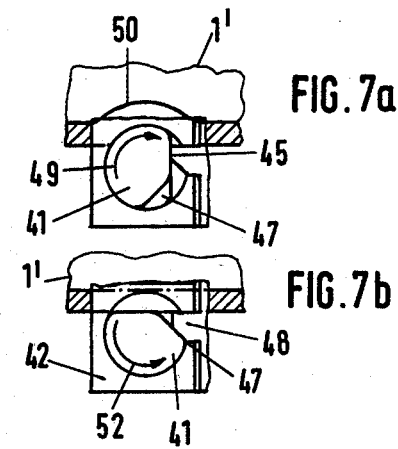

RELEASABLE COUPLING AND METHOD FOR MAKING SUCH COUPLING

CROSS REFERENCE TO RELATED PATENTS

My present invention is an improvement of the releasable coupling for tubular members and the method for assemblying such coupling as disclosed in my prior U.S. Pat. No. 3,822,074 granted on July 2, 1974.

BACKGROUND OF THE INVENTION

The present invention relates to a releasable coupling for securing a tubular member to a further member and to a method for assemblying such a coupling. My above mentioned U.S. Pat. No. 3,822,074 relates to a releasable coupling for tubular members and method for assemblying such coupling to connect tubular members or the like to each other or to connect a tubular member to a pipe connector or the like. In my prior patent the tubular member is inserted into another tubular member having a sufficient inner diameter or in a pipe connector element and a locking pin is inserted into a hole extending substantially tangentially or at a slant relative to the opening into which the tubular member is inserted. There is a certain overlap between the opening and the hole so that the insertion of the locking pin deforms the tubular member to thereby effectively interlock the two elements with each other.

The structure of my prior patent is very effective, especially where gas tied connections are to be established between pipes and the connection is accomplished by relatively simple connecting elements as well as by a minimum of assemblying costs. As mentioned, the insertion of the locking pin results in a deformation of one of the tubular members, thereby providing for a friction lock between the two interconnected elements and the wedging action of the locking pin provides an adequate and effective coupling which is capable, in mechanical respects, to withstand substantial loads in operation while nevertheless being capable of an easy release of the connection.

However, the type of locking pin disclosed in my earlier U.S. Pat. No. 3,822,074 requires, that the coupling member proper as well as the tubular member are of sufficient size to receive the hole for the locking pin and to provide sufficient material that can be deformed by the locking pin. Further, in some of the embodiments of my earlier patent there must be sufficient space externally of the coupling for using a hammer or the like to force the locking pin into the interlocking position.

It is also known to interconnect tubular members by the insertion of a nail type coupling element which extends substantially all around the inner tubular member in a region of overlap between the two tubular members. Such nail type interlocking elements provide an adequate locking against axially effective forces. However, no efficient interlocking against circumferentially effective forces is accomplished by these prior art devices.

OBJECTS OF THE INVENTION:

In view of the above it is the aim of the invention to achieve the following objects, singly or in combination:

to improve the prior art devices, especially with regard to the possibility of connecting even the smallest tubular members to each other;

to construct the locking pin in such a manner that its initial insertion is easily accomplished without any deformation of the tubular member and that a rotation of the locking pin after insertion causes the desired deformation and interlocking;

to construct the locking pin in such a manner that its insertion is independent of its locking function so that the pin may be inserted without any substantial force;

to provide the locking pin with an externally accessible actuating means for imparting a rotational locking movement to the pin; and to provide a hollow sleeve type locking pin with a longitudinal slot in its side which will provide an elastical yielding on the part of the locking pin when the latter is rotated into the locking position.

SUMMARY OF THE INVENTION

According to the invention there is provided a coupling for securing a tubular member to a further member such as a coupling element or the like. The coupling element has an aperture for the insertion of the tubular member and a hole for the insertion of a locking pin. The hole and the aperture partially overlap. The locking pin is provided with actuating means at one end thereof and with a flattened region intermediate its ends, whereby the locking pin may be initially inserted into the hole without deforming the tubular member inserted in said aperture and wherein rotation of said locking pin in the hole deforms the tubular member to lock the latter in the aperture of the connecting member.

According to the invention there is further provided a method for making a releasable coupling between the tubular member and a further member such as a connecting element having an aperture therein and a hole extending substantially tangentially relative to the aperture and partially overlapping the aperture, wherein a locking pin is provided with a flattened side region. Thereupon the tubular member is inserted into the aperture and then the locking pin is inserted into the hole with the flattened region facing the tubular member. Thereafter the locking pin is rotated until the flattened region faces substantially away from the tubular member, whereby the body of the locking pin deforms the tubular member as a result of the rotation of the locking pin.

BRIEF FIGURE DESCRIPTION:

In order that the invention may be clearly understood, it will now be described, by way of example, with reference to the accompanying drawings, wherein:

FIG. 4 illustrates a side view of a locking mechanism for securing a tubular member to a wall or the like;

FIG. 5 is a sectional view through the locking mechanism of FIG. 4;

FIG. 6 is a top plan view of the locking mechanism of FIG. 4;

FIG. 7a shows the locking pin of FIG. 4 in the locked position;

FIG. 7b shows the locking pin of FIG. 4 in the unlocked position;

Figure 1A:
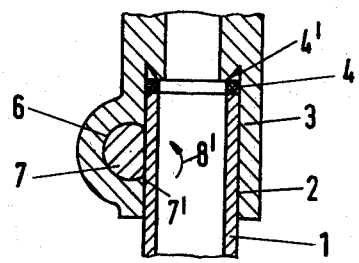
FIG. 1a shows a sectional axial view through one embodiment of a coupling, according to the invention, with the locking pin in a position prior to its rotation.

DETAILED DESCRIPTION OF PREFERRED EXAMPLE EMBODIMENTS:

Referring to FIG. 1a, the free end of the tubular member 1 is inserted into an aperture 2 in a further member 3, which may be another tubular member or a pipe end or a pipe connector or the like. The further member 3 is provided with a shoulder 4' supporting a sealing ring 4. The free, clean cut end of a tubular member 1 rests initially lightly against the sealing ring 4, as best seen in FIG. 1a.

The further member 3 which also may be a hose connector or the like is provided with a hole 6 extending substantially tangentially relative to the aperture 2 and in such position that the volume of the hole 6 somewhat overlaps the volume of the aperture 2. A locking pin 7 is inserted into the hole 6. According to the invention a locking pin 7 is provided with a flattened region 8 along one side thereof. As shown in FIG. 1a, initially the locking pin 7 is inserted into the hole 6 with the flattened region 8 facing toward the tubular member 1. In order to lock the tubular member 1 inside the further member 3 the locking pin 7 is rotated preferably in the direction of the arrow 8' as shown in FIG. 1a, whereby the edge 7' of the locking pin 7 pushes the free end of the tubular member 1 against the sealing ring 4 which is thus forced into the recess 5 around the shoulder 4'. Simultaneously, the continuing rotation of the locking pin 7 deforms the tubular member 1 as shown in FIG. 1b, whereby the tubular member 1 is locked in position while simultaneously assuring a good seal between the free ends of the tubular member 1 and the sealing ring 4, as best seen in FIG. 1b.

The insertion of the locking pin 7 as shown in FIG. 1a is easy because there is no interference initially between the flattened region 8 of the locking pin 7 and the tubular member 1. It has been found that the action of the rotating locking pin 7 greatly improves the seal between the two elements so that a gas type seal is obtained and so that the two members are prevented from rotating relative to each other.

Figure 2A:
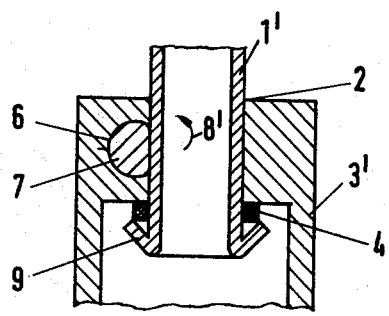
FIG. 2a illustrates another embodiment according to the invention, again in an axial section and with the locking pin in a position prior to its rotation.
Figure 2B:
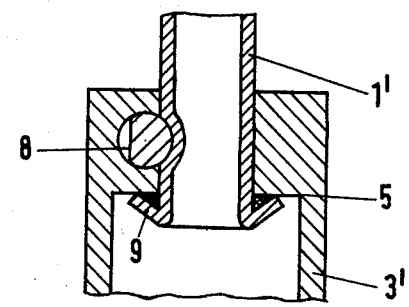
FIG. 2b is the same sectional illustration as that of FIG. 2a, however with the locking pin after its rotation into the interlocking position.

FIGS. 2a and 2b illustrate a modified embodiment according to the invention, wherein the tubular member 1' is provided with a bent flange 9. The angle between the flange 9 and the side wall of the tubular member 1' is preferably less than 90°, whereby, for example, the complementary angle may be 135° so that the two angles make up an angle of 180°. The further member to which the tubular member 1' is to be secured, may for example, be a socket or hose connector 3', provided with an internal shoulder around the aperture 2, whereby the flange 9 may again initially rest against a sealing ring 4 sitting on the internal shoulder of the connector member 3'.

Figure 1B:
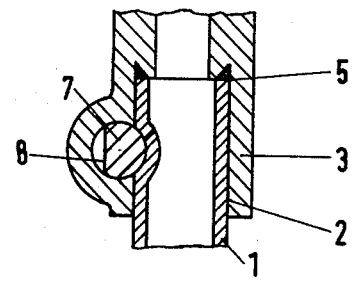
FIG. 1b is a view similar to that of FIG. 1a, but showing the locking pin in a position after its rotation.

The operation is again similar to that illustrated in FIGS. 1a and 1b because the rotation of the locking pin 7 in the direction of the arrow 8' in FIG. 2a will pull the flange 9 against the sealing rings 4, thus pressing the sealing ring into the groove by the flange to provide the seal as shown at 5 in FIG. 2b, whereby again a gas tight seal is obtained and the members 1' and 3' are prevented from rotating relative to each other.

Figure 3:
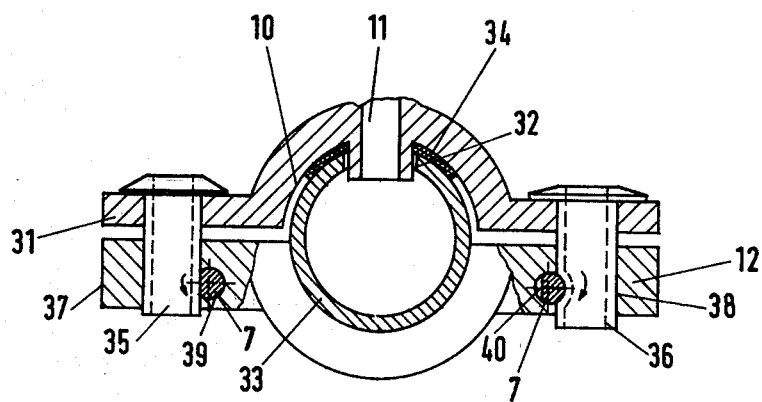
FIG. 3 illustrates a sectional view through a pipe coupling device, wherein the present type of locking pin is used to hold two tubular rivets in place.

FIG. 3 illustrates a further embodiment according to the invention, wherein a gas tight cap is made by means of a pipe connector 31 and a pipe clamp 12. The pipe connector 31 is provided with a semi-circular recess and a nipple 11 extends through a lateral hole 32 into the tubular member 33. A sealing gasket 34 surrounds the nipple 11 and the hole 32.

The pipe connector 31 is secured to the tubular member 33 by means of the pipe clamp 12 and by means of two hollow rivets 35 and 36. In this embodiment the hollow rivets 35 and 36 constitute the "tubular member" with which the locking pins, according to the invention, cooperate. The pipe clamp element 12 is provided with apertures 37 and 38 as well as with holes 39 and 40. Each hole 39 and 40 receives a locking pin 7 as described above. The pipe clamp 12 may be tightened against the pipe connector 31 by simply rotating the locking pins 7. Thus, the locking pin 7, in the hole 39 would be rotated counterclockwise whereas the locking pin 7 in the hole 40 has been rotated clockwise, whereby the tightening of the two hollow rivets 35 and 36 provides a proper seal around the hole 32 in the pipe 33. It will be noted that the locking pin 7 in hole 40 has already deformed the hollow rivet 36, whereas the locking pins 7 in the hole 39 will deform the hollow rivet 35 when the pin 7 is rotated in the hole 39.

FIGS. 4, 5 and 6, as well as 7a and 7b illustrate a further embodiment of the invention employing a locking pin 41 and a pipe lock housing 42. The arrangement is such that a pipe member such as member 1' shown in FIGS. 2a and 2 may be secured to a wall 13 or the like as shown in FIG. 5. The wall 13 and the tubular member 1' are shown in phantom lines in FIG. 5 to facilitate the illustration of the lock housing 42 and the locking pin 41 which is provided with an actuating member 43 which may be, for example, a hexogonal head 43, which preferably may be provided with a notch 44 indicating to the user the location of the notched or flattened region 45 on the side of the locking pin shaft. Once the locking pin shaft is inserted into the hole 46, the user then will still be able to know where the flattened or notched region 45 is located by observing the position of the notch 44. This is an advantage because by properly setting the locking pin 41 and rotating it in the correct direction, the housing 42 of the pipe lock will be clamped against the wall 13, thereby securing the tubular member 1' with its flange 9 tightly against the wall 13. The tightening is enhanced by placing the hole 46 at an angle or slant relative to the vertical, as best seen in FIG. 5.

To make certain that the locking pin 41 may be rotated only in a certain rotational direction or to a certain extent there is provided a notch 47 at the lower end of the flattened region 45 in the locking pin 41. This notch cooperates with a respective shoulder 48 of the housing 42 at the lower end of the hole 46 in such a manner that the locking pin 41 can be rotated out of its zero or neutral position, so to speak, only in one direction and only through an angle of about 90°. As shown in FIG. 7a rotation of the locking pin 41 in the direction of the arrow 49 locks the lock housing 42 in position by forming the bulge 50 in the tubular member 1' which is inserted into the aperture 51 in the lock housing 42. FIG. 7b shows the locking pin 41 in the unlocked position after rotation in the direction of the arrow 52 or prior to any rotation of the locking pin 41, whereby the notch 47 rests against the shoulder 48, as best seen in FIG. 7b, thereby limiting any further rotation of the pin 41 in the diretion of the arrow 52.

Due to the above described slant of the hole 46, in combination with the particular shape of the flattened region 45, a wedging action is combined with a levering action, whereby the housing 42 is tightly pressed against the wall 13, thereby securing the tubular member 1' with its flange 9 against one side surface of the wall 13.

The release of the locking mechanism as has been just described with reference to FIG. 7b, applies also to the embodiment of FIGS. 1, 2, and 3 since it is merely necessary to rotate the locking pin out of the locking position.

In all embodiments the locking and releasing may be effected repeatedly since the deformation of the tubular member, even if it should not be an elastic deformation but a remaining deformation does not interfere with the repeated interlocking. Even if the locking pin and the tubular member contact each other in the same areas as in a previous interlocking. This satisfactory repeated sealing is apparently enhanced by the elastic deformation of the sealing ring 4 and/or of the elastic deformation of the flange 9.

Figure 10:
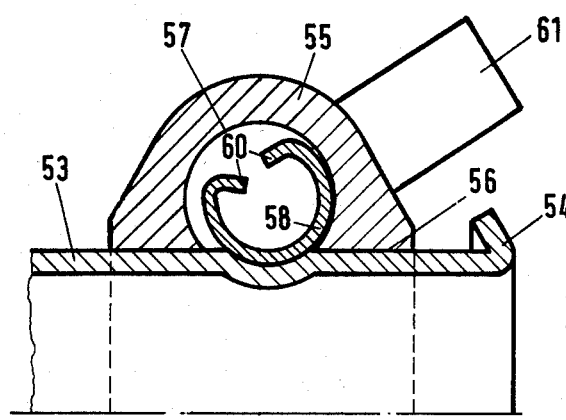
FIG. 10 shows the locking pin substantially in the locked position.
Figure 9:
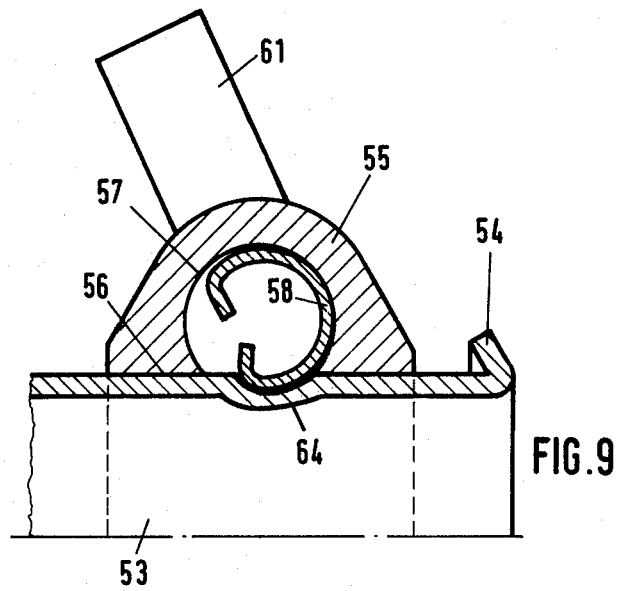
FIG. 9 shows a view similar to that of FIG. 8, but with the locking pin moving into the material deforming locking position.
Figure 8:
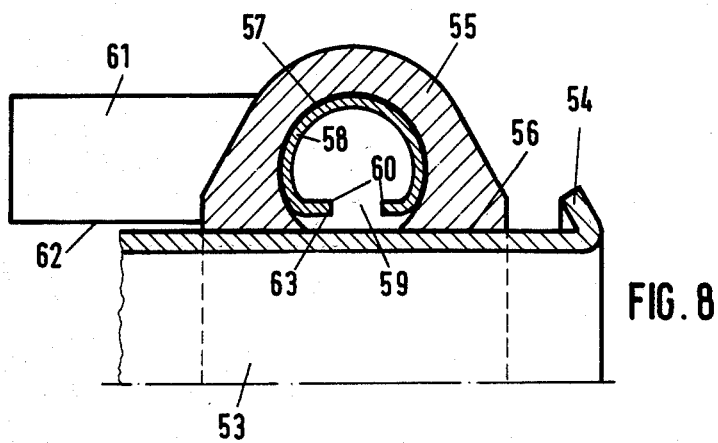
FIG. 8 shows a sectional view through a further embodiment of the invention employing a hollow sleeve with a longitudinal slot as the locking pin, thereby illustrating the locking pin in the unlocked position.

FIGS. 8, 9, and 10 illustrate a further embodiment of the releasable connector, according to the invention, wherein a tubular member 53, for example, with an end flange 54 is secured to a further member 55 such as a ring connector or the like. The ring connector 55 is provided with an aperture 56 through which the tubular member 53 extends. The ring connector 55 further has a hole 57 into which is inserted a locking pin 58 formed as a hollow sleeve with a longitudinally extending slot 59. If desired, the edges 60 defining the slot 59 may be bent inwardly as illustrated. However, this is not a feature absolute necessary for the proper operation of the locking pin 58 which is made of spring steel to be elastically deformed, as illustrated in FIGS. 8, 9, and 10.

Incidentally, the opening angle of the gap or slot 59 may range, for example, from 30° to 150°, depending on the size of the sleeve and the type of material used for making the locking sleeve 58. Further, the locking sleeve is provided with a handle 61 which may simply be a portion of the sleeve bent sideways. The lower edge 62 of the operating handle 61 may preferably extend in alignment with the flattened region 63 of the sleeve type locking pin 58. Thus, the user will know the location of the flattened region when the sleeve type 58 is inserted into the hole 57 as shown in FIG. 8.

Rotation of the handle 61 in the clockwise direction, for example, through an angle of 60° as shown in FIG. 9 will engage the locking sleeve 58 with the body of the tubular member 53, thereby deforming it as shown at 64 in FIG. 9. Since the sleeve type locking pin 58 is also made of elastic material, it may be deformed somewhat as it deforms the tubular member 53, whereby the locking forces even increase. Further rotation of the handle 61 through a total angle of about 150° as shown in FIG. 10 completes the interlocking. The interlocking may simply be released by returning the handle 61 into the position shown in FIG. 8.

In the light of the above disclosure the following advantages of the invention should be emphasized. The flattened region, may for example, be limited to that portion of the length of the shaft which will be effective in the deformation of the tubular member, whereby the simple structure of the locking pin or locking sleeve is especially suitable for mass production.

The embodiment of FIGS. 4, 5, 6, and 7 is especially suitable for connecting a pipe or hose to any flat surface, for example, to a container wall, whereby the flange 9 of the tubular member 1' may be located either on the inside or on the outside of a container. The walls 13 may also form part of a substantially larger tubular member. In all of these embodiments the flange 9 facilitates and enhances the sealing, since a sealing ring may easily be held inside the groove formed by the flange 9 as best seen in FIG. 2b, whereby an elastic seating of the sealing ring is accomplished. A further advantage of the invention is seen in that due to the particular shape of the actuating member, or of a cooperating notch and shoulder as illustrated in FIGS. 5, 7a, and 7b, the proper location of the locking pin is always indicated, thus preventing an unlocking where a locking is desired, and vice versa. This advantage is also accomplished by the embodiment of FIGS. 8, 9, and 10, by the location of the handle 61. The same safety against erroneous actuation may be accomplished by the slanted position of the hole 46 in such a manner that only the correct positioning of the housing 42 will permit the actuation of the locking pin 41, as illustrated in FIG. 5. An added safety is accomplished by the above mentioned cooperation of the notch 47 and the shoulder or nose 48. In order to assure that the locking pin is enabled to rotate through an angle of at least 90°, the locking pin may also be provided with a further flattened area as illustrated in FIGS. 7a and 7b to provide a recess near the free end of the pin 41 into which the shoulder or nose 48 may reach without hindering the rotation of the locking pin within the range provided by the flattened region 45.

The embodiment of FIGS. 8, 9, and 10 has the further advantage that the sleeve type locking pin 48 may be inserted into the hole 57 with a certain spring bias by first compressing the sleeve 58 somewhat so that the two edges 60 move toward each other and then releasing the sleeve when it is inserted into the hole 57. As the sleeve is released, the radially effective pressure also locks the sleeve in the hole 57 in a force locking manner, thereby preventing an axial displacement of the sleeve 58. Another advantage is seen in that the actuating lever 61 may simply be a portion of the sleeve bent over which is also amenable to mass production. In the simplest embodiment a cylindrical tubular member may merely be slotted along its cylinder wall without even drawing the edges 60 inwardly. However, the embodiment with the inwardly drawn edges will be preferred where the material of the tubular member is a softer type. In any event, care will be taken to coordinate the opening angle of the slot 59, or rather the width of the slot 59 and the wall thickness of the sleeve 58 with due regard to the intended deformation and spring bias effect. Similarly, it may be advantageous to coordinate the slant of the hole through the connecting member with the direction of the slot which thus may also be slanted.

Although the invention has been described with reference to specific example embodiments, it will be appreciated, that it is intended to cover all modifications and equivalents within the scope of the appended claims.

What is claimed is:

1. A releasable coupling for securing a deformable tubular member having a first longitudinal axis, to a further member comprising an aperture with a second longitudinal axis extending coaxially with said first longitudinal axis to receive said deformable tubular member in said aperture of said further member, a hole in said further member located adjacent to said aperture in such a position relative to said aperture that the volume of the hole partially overlaps the volume of the aperture for said deformable, tubular member, locking pin means in said hole, said locking pin means comprising actuating means at one end thereof and a flattened side region intermediate its ends and located at the level of said overlapping volume when said locking pin means is inserted in said hole, whereby the locking pin means may be initially inserted into said hole so that said flattened side region of said locking pin faces said deformable tubular member without initially deforming the deformable tubular member inserted in said aperture, and wherein rotation of said locking pin means in said hole in a direction against withdrawal of said deformable tubular member deforms said deformable tubular member first by a denting action followed by a wedging action to lock the latter in said aperture against withdrawal.

2. The releasable coupling of claim 1, wherein said actuating means of said locking pin means are adapted for actuation by a conventional tool.

3. The releasable coupling of claim 1, wherein said flattened region of said locking pin means extends longitudinally in one side of the locking pin means in the region where said hole and said aperture overlap when the pin means are initially inserted in said hole.

4. The releasable coupling of claim 1, wherein said tubular member has a rim which extends outwardly and toward the tubular member so that the angle between the rim and the side of the tubular member is less than 90°, said rim resting against said further member when the two members are coupled to each other.

5. The releasable coupling of claim 1, wherein said hole has a longitudinal axis extending at a slanted angle relative to said first and second axes, said flattened region of said locking pin means having a length which takes into account the slanted position of the locking pin means, whereby the length of contact between the locking pin means and the tubular member is increased.

6. The releasable coupling of claim 5, wherein the direction of insertion of said tubular member into said aperture and the longitudinal axis of said locking pin means form an acute angle.

7. The releasable coupling of claim 5, wherein said hole in said further member has a stepped bottom, and wherein said locking pin means has two flattened regions of which the flattened region at the end of said locking pin means is more pronounced than the flattened region intermediate the ends of the locking pin means, said flattened region at the end of said locking pin means cooperating with said stepped bottom when the locking pin means is inserted into said hole.

8. The releasable coupling of claim 1, wherein said locking pin means comprise a hollow sleeve of spring steel with a longitudinal slot through the sleeve, said slot facing said aperture when the hollow sleeve is inserted initially into said hole in said further member, said slotted sleeve locking said tubular member in position in said aperture upon rotation of said sleeve, whereby the elastic deformation of said slotted sleeve facilitates the locking.

9. The releasable coupling of claim 8, wherein said hollow, slotted sleeve has at one end thereof a portion bent out of the body of the sleeve which bent out portion serves as said actuating means.

10. The releasable coupling of claim 8, wherein said slot extends over an angle within the range from about 30° to about 150°, said angle being defined by two radially extending lines.

11. The releasable coupling of claim 8, wherein a plane defined by said slot coincides with the plane of intersection between said aperture and said hole in said further member.

12. The releasable coupling of claim 8, wherein said slot has inwardly bent edges.

13. The releasable coupling of claim 8, wherein said hole slants at an angle relative to said first and second axes, whereby the longitudinal slot of said hollow sleeve is arranged to have a sufficient length for cooperation with said slanted hole to cause said locking.

14. A method for making a releasable coupling between a tubular member and a further member having an aperture therein and a hole extending substantially tangentially relative to said aperture and partially overlapping said aperture, comprising providing a locking pin with a flattened side region, inserting said tubular member into said aperture, inserting said locking pin into said hole so that said flattened side region of said locking pin faces said tubular member, and then rotating said locking pin until said flattened region faces away from said tubular member.

15. The method of claim 14, wherein said locking pin is rotated through an angle range from about 90° to about 180°.

* * * * *